Sept. 11, 1956          R. W. DEAR          2,762,159
DISPLAY DEVICES FOR BOOKS, MAGAZINES, OR LEAFLETS
Filed Dec. 8, 1954          3 Sheets-Sheet 1
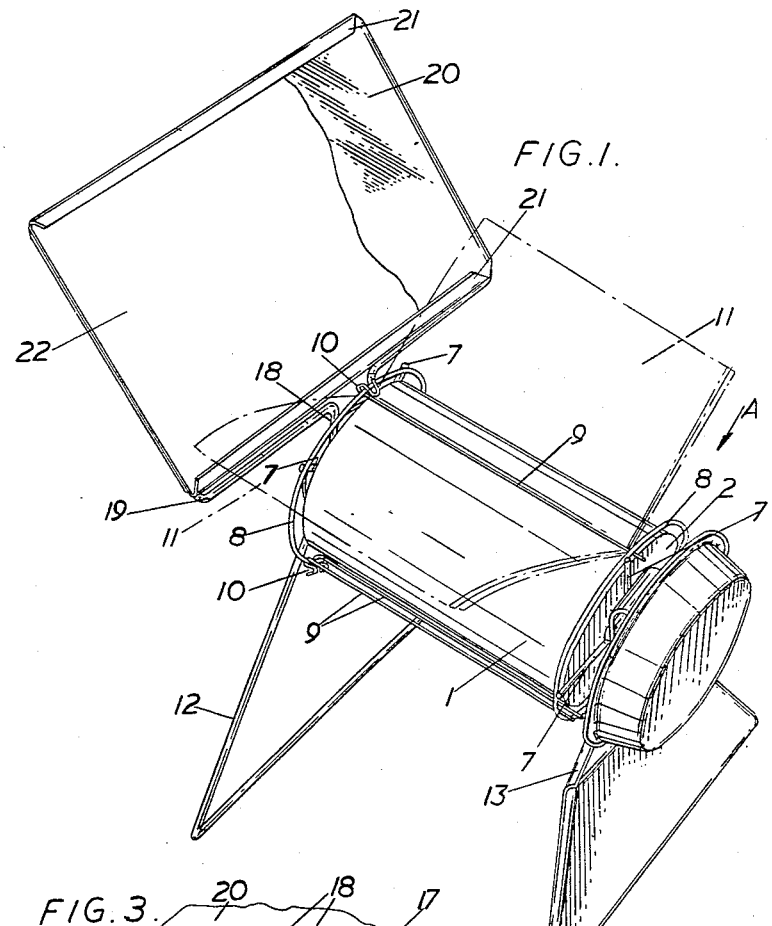
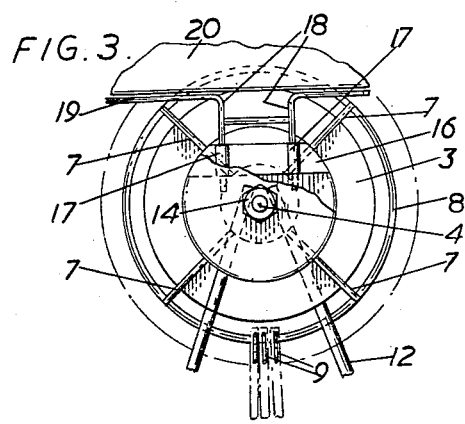
Inventor
ROBERT W. DEAR
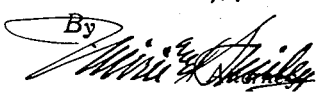

Sept. 11, 1956  R. W. DEAR  2,762,159
DISPLAY DEVICES FOR BOOKS, MAGAZINES, OR LEAFLETS
Filed Dec. 8, 1954  3 Sheets-Sheet 2
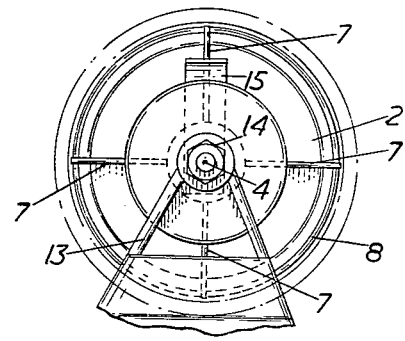
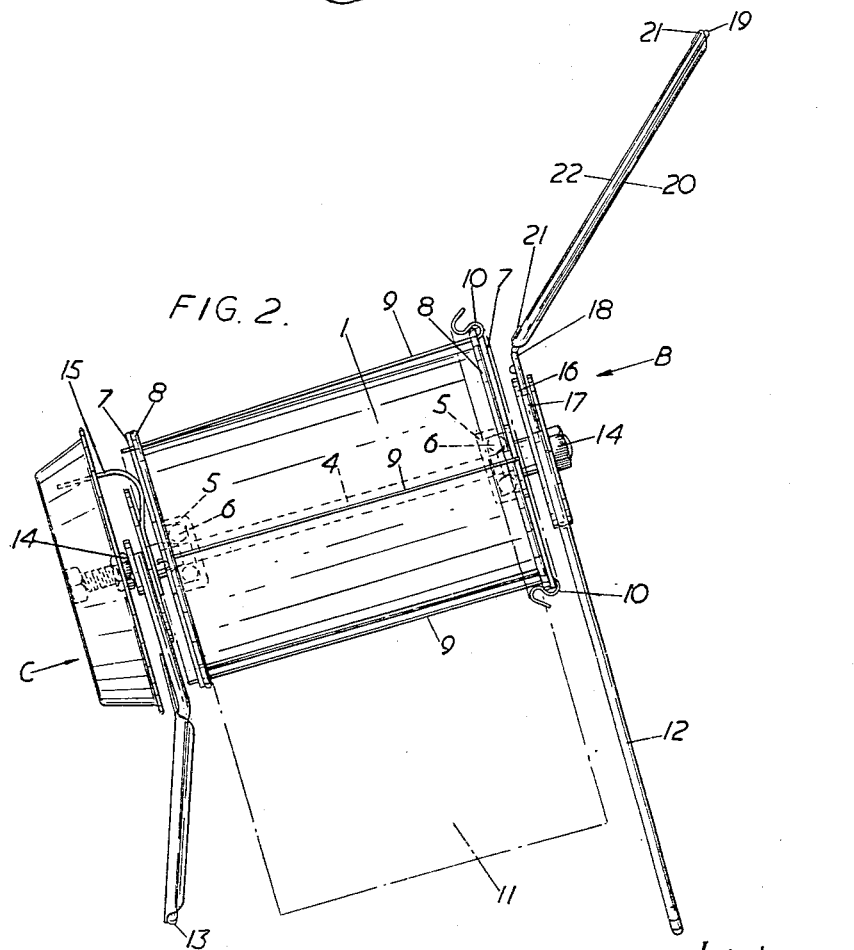
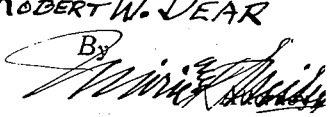

Sept. 11, 1956  R. W. DEAR  2,762,159
DISPLAY DEVICES FOR BOOKS, MAGAZINES, OR LEAFLETS
Filed Dec. 8, 1954  3 Sheets-Sheet 3

Inventor
ROBERT W. DEAR

United States Patent Office 2,762,159
Patented Sept. 11, 1956

2,762,159

DISPLAY DEVICES FOR BOOKS, MAGAZINES, OR LEAFLETS

Robert William Dear, Harrow-Weald, England, assignor to Focal Press Limited, London, England, a British company Application December 8, 1954, Serial No. 473,900

3 Claims. (Cl. 45—81)

This invention relates to a display device for books, magazines, or leaflets and has for its main object to provide a display device by which may be supported a plurality of books, magazines, or leaflets for selective perusal thereof.

According to the present invention a display device for books, magazines, or leaflets, comprises a display member supported for rotation about the longitudinal axis thereof, and wires to extend lengthwise of the display member each for insertion between the pages of a book, magazine, or leaflet thereby to co-operate with the display member to constrain the spine of the book, magazine, or leaflet between it and the display member.

Figure 6:
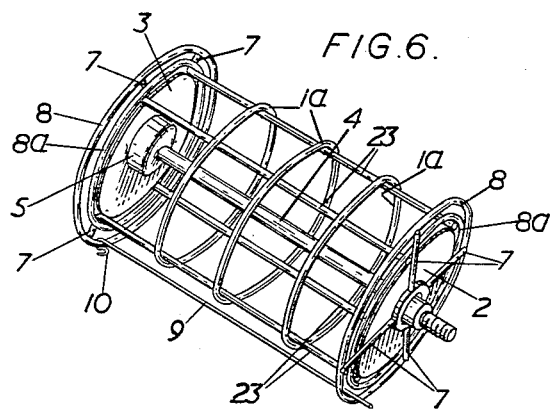
Figure 5:
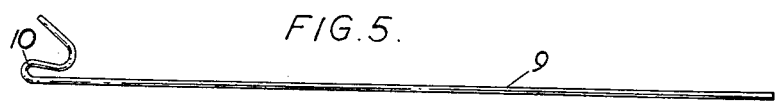

In order that the invention may be clearly understood, two embodiments thereof will now be described, by way of example, with reference to the accompanying drawings, in which:

Fig. 1 is a pictorial illustration of a display device according to the invention, Fig. 2 is a side elevation of Fig. 1 looking in the direction of arrow "A," Fig. 1, Fig. 3 is an end elevation looking in the direction of arrow "B," Fig. 2, Fig. 4 is an end elevation looking in the direction of arrow "C," Fig. 2, Fig. 5 is an elevation of a retaining wire employed in the device, and Fig. 6 is a diagrammatic pictorial view of an alternative form of display member.

Referring to Figs. 1 to 5, the display device comprises a circular display member formed by a thin metal cylinder 1 the opposite ends of which are closed by circular end plates 2, 3. The end plates are a tight friction fit in the cylinder and each has a central bore to surround a fixed spindle 4, the end plates being spaced apart along the spindle. Each end plate carries a housing 5 for a ball-bearing 6, Fig. 2, by which the end plates are rotatable about the longitudinal axis of the spindle 4.

Secured to each end plate are four ring-supporting members 7 which extend beyond the periphery of the cylinder 1 and at their outer ends support wire-like elements shown as rings 8 which extend around the ends of the display member to overlie and be spaced from the periphery of the cylinder, to form wire-retaining means as described below.

A number of wires 9, of which one is shown in detail in Fig. 5 are provided to co-operate with the wire-retaining means formed by the rings 8 secured to the end plates, each wire 9 being a straight wire having a loop 10 at one end by which the wire may be hooked over one of the rings 8 as shown in Figs. 1 and 2, the opposite straight end of the wire being for insertion between the other of the rings and the cylinder 1. It will be understood that, if desired, a connecting device other than a hook may be provided on the wire for engagement with a ring 8.

The arrangement is such that when a wire 9 is placed between the leaves of a book, magazine, or leaflet, as indicated in chain line 11, Fig. 1, and hereinafter referred to as "a book," and is arranged to co-operate with the rings 8 carried by the end plates in the manner just described, the spine of the book is constrained between the wire 9 and the spine-engaging member formed by the cylinder 1. Accordingly those edges of the pages which are opposite the spine of the book extend outwards from the cylinder 1 and the book can conveniently be opened at any page to permit reading thereof.

A plurality of wires 9 are provided in order that a plurality of books may simultaneously be supported by the display device for selective reading and in one embodiment of the invention, with a cylinder having a diameter of approximately six inches, one hundred books each of a thickness of about one-half inch may be supported by the display device for selective reading.

Adjacent its opposite ends, the spindle 4 is supported by a pair of stand members 12, 13 to which it is secured against rotation and longitudinal movement by nuts 14. The ends of the spindle 4 are supported at different levels as shown in Figs. 1 and 2, in order that the longitudinal axis of the display member be inclined to facilitate the opening and reading of books supported thereby. The display member can be rotated about the spindle 4 to bring to the reading position any desired book supported by the display member, such book, being, as stated above, capable of being opened to permit any page thereof to be read. To one end of the spindle 4 is secured a detent spring 15, which by pressure exerted thereby against one of the ring-supporting members 7 act to retain the cylinder 1 against unintentional rotation during perusal of a selected book carried by the cylinder.

To the stand member 12 is secured a frame supporting plate 16, Figs. 2 and 3, carrying sockets 17 into which can be fitted the legs 18 of a frame 19 which supports a backing sheet 20 having overturned edge portions 21 between which can be located an index card or sheet 22 containing particulars of the books supported by the display device.

In an alternative embodiment of the display member, as diagrammatically illustrated in Fig. 6, the end plates 2, 3 are retained in spaced relation by rods 23 secured to the peripheries thereof in any suitable manner. The ring-supporting member 7, in addition to supporting a ring 8, also support a second ring 8a of smaller diameter than that of the ring 8 and closely surrounding the ends of the rods 23. The spine-engaging member is formed by three equi-spaced rings 1a carried by and surrounding the rods 23, and of a diameter approximately equal to that of the rings 8a. Thus when a wire 9 is placed between the leaves of a book and is arranged over a ring 8 and between the rings 8, 8a, as illustrated in Fig. 6, the spine of the book is constrained between the wire 9 and the spine-engaging rings 1a.

It will be readily understood that, if desired, any of a number of modifications may be made to the structure herein specifically described. For example, the wires 9 for insertion between the pages of books may be permanently attached to the display member either to be immovable relative thereto or to be slidable around the periphery thereof.

It will also be understood that although in the preferred embodiment of the invention the display member is circular it may, if desired, be polygonal for example it may be hexagonal or octagonal.

I claim:

1. A display device for books, magazines, or leaflets, comprising a spindle supported for free rotation about an axis inclined to the horizontal, a pair of circular end plates secured to and spaced apart along said spindle, at least one circular spine-engaging member carried by and located between said end plates, a wire-retaining ring carried by and concentric with each end plate, and freely detachable rigid straight wires each having an open hook at one end for engagement with one said wire-retaining ring and its other end arranged for insertion through the other of the wire-retaining rings whereby when a wire is inserted between the pages of a book, magazine, or leaflet and is engaged with the wire-retaining rings the spine of the book, magazine, or leaflet is constrained between the wire and the circular spine-engaging member.

2. A display device for books, magazines, or leaflets, comprising a spindle supported for free rotation about an axis inclined to the horizontal, a pair of circular end plates secured to and spaced apart along said spindle, a spine-engaging cylinder extending between and carried by said end plates, a wire-retaining ring carried by and concentric with each end plate, and freely detachable rigid straight wires each having an open hook at one end for engagement with one said wire-retaining ring and its other end arranged for insertion through the other of the wire-retaining rings whereby when a wire is inserted between the pages of a book, magazine, or leaflet and is engaged with the wire-retaining rings the spine of the book, magazine, or leaflet is constrained between the wire and the spine-engaging cylinder.

3. A display device for books, magazines, or leaflets, comprising a spindle supported for free rotation about an axis inclined to the horizontal, a pair of circular end plates secured to and spaced apart along said spindle, rods extending between said end plates and arranged to be parallel with and spaced around said spindle, spine-engaging rings spaced apart axially of the spindle and carried by said rods, and freely detachable rigid straight wires each having an open hook at one end for engagement with one said wire-retaining ring and its other end arranged for insertion through the other of the wire-retaining rings whereby when a wire is inserted between the pages of a book, magazine, or leaflet and is engaged with the wire-retaining rings the spine of the book, magazine, or leaflet is constrained between the wire and the spine-engaging rings.

References Cited in the file of this patent

UNITED STATES PATENTS

| | | |
|---|---|---|
| 452,398 | Swartz | May 19, 1891 |
| 576,928 | Whitney | Feb. 9, 1897 |
| 695,964 | Taggart | Mar. 25, 1902 |
| 1,254,224 | Hauser | Jan. 22, 1918 |
| 1,569,365 | Goldberg | Jan. 12, 1926 |
| 1,764,325 | Lupien | June 17, 1930 |
| 2,589,383 | Holt | Mar. 18, 1952 |

FOREIGN PATENTS

| | | |
|---|---|---|
| 76,689 | Switzerland | May 8, 1917 |